United States Patent [19]

Paillard

[11] 4,079,804

[45] Mar. 21, 1978

[54] ELECTRONIC DEVICE FOR CONTROLLING THE BRAKES OF A VEHICLE

[76] Inventor: Claude André Paillard, 9 rue d'Astorg, Paris 8eme, France

[21] Appl. No.: 644,645

[22] Filed: Dec. 29, 1975

[51] Int. Cl.² .......................... B60T 7/20; B60T 8/02
[52] U.S. Cl. ........................ 180/103 BF; 73/517 R; 180/14 R; 188/138; 188/140 R
[58] Field of Search .......... 180/103 BF, 103 R, 14 R; 73/517 R; 188/137, 138, 140 R

[56] References Cited

U.S. PATENT DOCUMENTS

| | | | |
|---|---|---|---|
| 2,856,036 | 10/1958 | Mullen | 180/103 BF |
| 2,870,876 | 1/1959 | Pease | 188/140 R |
| 3,025,461 | 3/1962 | Snellen | 73/517 R X |
| 3,060,370 | 10/1962 | Varterasian | 73/517 R |
| 3,151,487 | 10/1964 | Schuck | 73/517 R |
| 3,187,254 | 6/1965 | Wasserman | 73/517 R X |
| 3,396,328 | 8/1968 | Yuan | 73/517 R |
| 3,486,799 | 12/1969 | Greentree | 180/103 R X |
| 3,572,109 | 3/1971 | Yerman | 73/517 R X |
| 3,769,844 | 11/1973 | Skoures | 73/517 R |

Primary Examiner—Joseph F. Peters, Jr.
Assistant Examiner—John P. Silverstrim
Attorney, Agent, or Firm—Walter Becker

[57] ABSTRACT

The device comprises a magnetic inertia block connected to return means fixedly mounted onto either a pulled vehicle or a pulling vehicle, magnetic transducer positioned adjacent the magnetic inertia block and connected to a current source, treating means connected to said magnetic transducer, output of said treating means being connected to the brakes of the vehicle.

2 Claims, 8 Drawing Figures

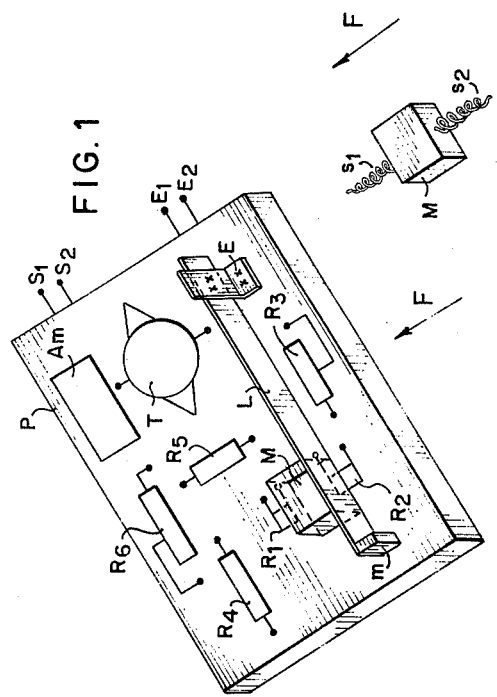
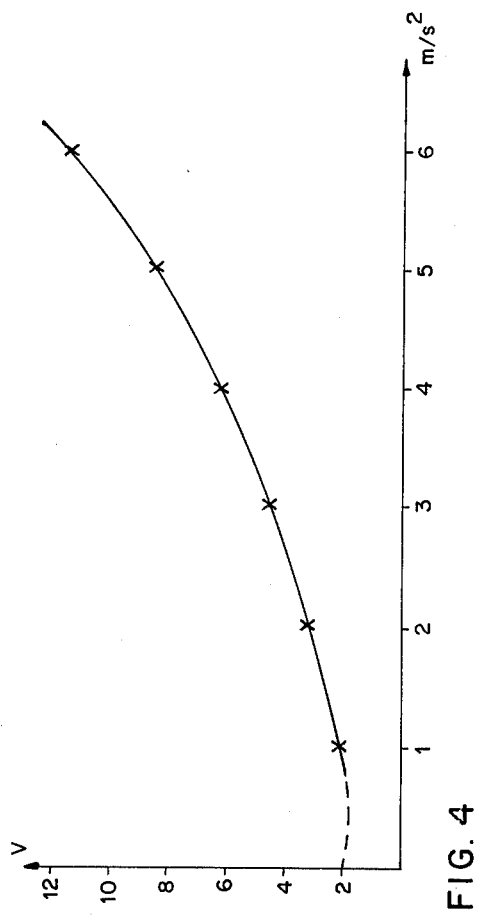
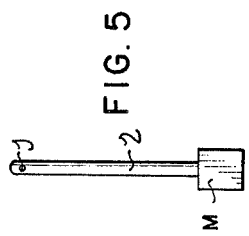
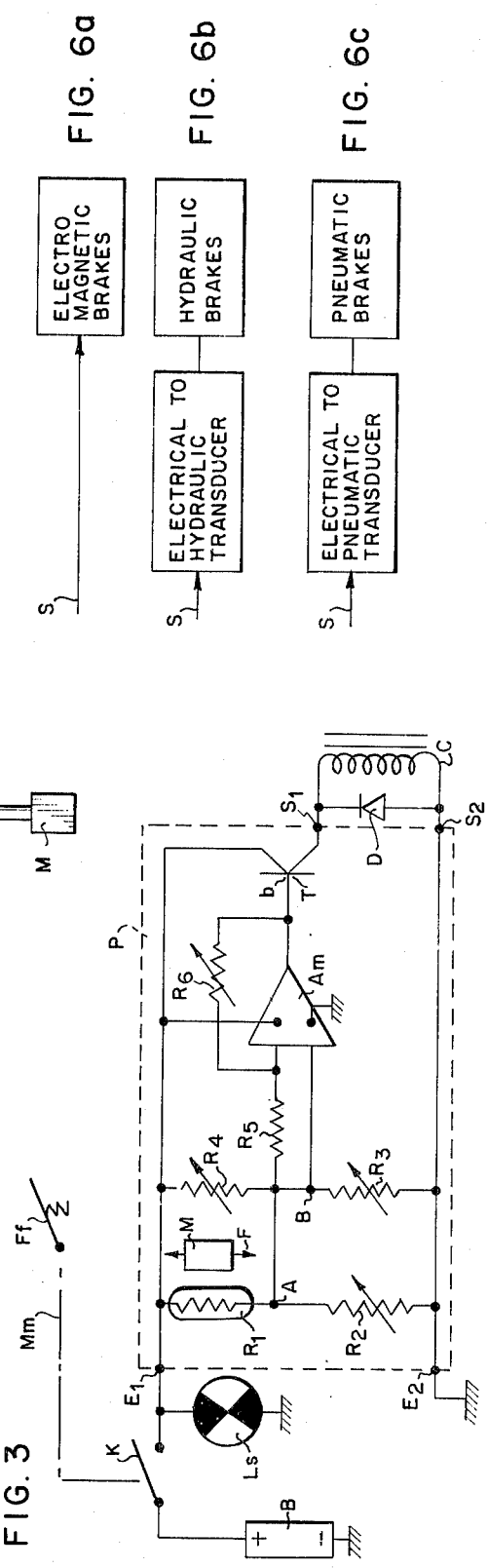

4,079,804

ELECTRONIC DEVICE FOR CONTROLLING THE BRAKES OF A VEHICLE

BACKGROUND OF THE INVENTION

The present invention relates to an electronic device for controlling the brakes of a vehicle and is particularly provided for the control of electro-magnetic brakes for a towed or pulled vehicle.

Though the device according to the invention uses an inertia block, said device is different from all the inertia and generally pendular devices presently used in relation with the braking of pulled vehicles. Particularly, contrary to already known devices, it does not require use of incandescent or infra-red lamps which have a very limited life-time, nor photosensitive cells able to have an important drift depending on the weather and other ambient conditions.

SUMMARY OF THE INVENTION

The invention has for its purpose a device providing an electric current which is substantially proportional to the instantaneous deceleration or braking acceleration of the vehicle, said current being either applicable directly to electromagnetic brakes, or as input to a transducer having an output as a hydraulic or pneumatic signal, said signal being then applied to the hydraulic or pneumatic brakes.

According to the invention, the device for controlling the brakes of a pulled vehicle which is towed by a pulling vehicle comprises:

a magnetic inertia block;

return means fixedly mounted on one of the two vehicles, said means being fixed to said magnetic inertia block for permitting movement substantially in parallel to the longitudinal axis of said one of the vehicles when the vehicle is decelerated and returning to an original position at end of the deceleration, whereby upon braking the deceleration causes the magnetic inertia block to continue its motion while driving the return means;

a magnetic transducer placed in vicinity of the magnetic inertia block, in parallel with its direction of motion, at least one electric characteristic of said magnetic transducer being modified in connection with the exposure or covering by the magnetic inertia block of the sensitive or active portion of the transducer, said transducer being electrically connected to a current source through a control switch;

treating means connected to said magnetic transducer for the treatment of said modified electric characteristic, output of said treating means being connected to the brakes of the vehicle.

Other objects and features of the invention will be apparent from the following description and claims and illustrated in the accompanying drawings, which disclose, by way of example, the principle of the invention, and the best mode contemplated for carrying it out.

BRIEF DESCRIPTION OF THE DRAWINGS

FIG. 1 is a diagrammatic perspective view of the device of the invention.

FIG. 2 represents a variant of one of the characteristic features of the device of FIG. 1.

FIG. 3 is an electric diagram of the device of the invention.

FIG. 4 is a curve explaining the operation of the device of the invention.

FIG. 5 shows a variant of one of the characteristic features of the device of FIG. 1.

FIGS. 6a, 6b and 6c are block diagrams of variant parts of the device of the invention.

DESCRIPTION OF THE PREFERRED EMBODIMENT

In FIG. 1, there is shown a plate P made of electrically insulating material on which have been placed the various components of the present device as they appear while connected in FIG. 3, in which the same elements bear the same references.

A resilient blade L is placed on the plate P through an angle plate or a square E and at the end of the blade there is fixed, for example by glueing, a magnetic inertia block M of any shape and nature, and if desired a non-magnetic inertia block m. The diagrammatic perspective view of FIG. 1 also shows two elements $R_1$ and $R_2$, of which one at least, the element $R_1$ is a magnetic transducer in the form of a magnetoresistance or of a Hall effect cell, while the element $R_2$ may be similar to element $R_1$ or may be a mere resistance. The device further comprises standard resistors $R_3$, $R_4$, $R_6$ with $R_3$ and $R_6$ being adjustable resistances. All the resistive elements are connected together, as better seen in FIG. 3, through an operational amplifier Am to a power transistor T, the output of the transistor T constituting the output terminals $S_1$ and $S_2$ of the device of which the input terminals are $E_1$ and $E_2$.

The plate P is fixedly mounted either on the pulling vehicle or on the pulled vehicle to control the brakes of the pulled vehicle; the arrow F of FIG. 1 showing the travelling direction of the vehicle, parallel to the axis of said vehicle.

It is then obvious that the magnetic inertia block M will, under the influence of a deceleration or braking acceleration, move with respect to its position at rest, in a way substantially parallel to the axis of the vehicle. Upon its motion, the magnetic inertia block will thus variably cover or expose the magnetic transducer $R_1$.

In the variant of FIG. 2, the magnetic inertia block M has been represented connected to springs $s_1$ and $s_2$ whose free ends are fixedly mounted to the plate P. The general direction of the springs $s_1$ and $s_2$ is that of the axis of the vehicle, parallel to the arrow F. Then in the event of a deceleration, the inertia block will variably cover or expose the magnetic transducer $R_1$ as explained hereinabove in relation to FIG. 1.

As known, a magnetic transducer is a component of which at least one electric characteristic is modified when a magnetic body comes close to its sensitive or active portion while exposing or covering said portion. Practically, the magnetic transducer is either a magneto-resistance or a Hall effect cell. However, for sake of simplifying the circuit, only the use of magneto-resistance is considered hereinbelow, and the magneto-resistance $R_1$ is placed on the plate P in such a way that it is influenced as soon as the inertia block will move.

It should be noted from the above disclosure, that when a deceleration occurs, the magnetic inertia block M tends to keep on moving and drives the resilient blade or the spring in its motion. The magnetic inertia block M thus comes close to the magneto-resistance $R_1$ whose resistance increases all the more that the magnetic inertia block is close. Therefore, the relative motion of the magnetic inertia block M and the magneto-resistance $R_1$ is all the more important commensurate with the fact that the deceleration is important. When the deceleration decreases, the resilient blade or the spring brings back the magnetic inertia block M towards its original or rest position.

It thus appears that with the use of a treatment means interpreting the resistance changes of the magneto-resistance at the moment of the deceleration, there can be formed an electric signals substantially proportional to the instantaneous deceleration of the vehicle on which the brakes must be applied, and as shown in FIG. 6a said signals can be directly applied to electro-magnetic brakes or yet sent towards an electrical-hydraulic or electrical/pneumatic transducer for the control of hydraulic or pneumatic brakes (FIGS. 6b and 6c respectively). In FIG. 3, the elements of FIG. 1 have then been shown as connected for the control of electro-magnetic brakes.

In FIG. 3, the magneto-resistance $R_1$ is inserted in the arms of a Wheatstone bridge having as other resistances $R_2$, $R_3$ and $R_4$. The magnetic mass M is shown in front of the magneto-resistance $R_1$ and the arrows $f$ illustrate the motion of the magnetic mass. The resistance $R_2$ is adjustable for setting the zero of the Wheatstone bridge in rest position of the inertia block M. The Wheatstone bridge is thus shown connected at $E_1$ to the terminals of a stop lamp $L_2$ which becomes lightened when the driver of the vehicle pushes on the brake pedal $F_f$. Actually, at that very moment, the contact K or stop switch is closed through a connection $M_m$, for example a mechanical connection, and, through the battery $B_{at}$ of the vehicle, the lamp $L_s$ is powered as well as the whole device.

The common points A and B to the resistances $R_1$-$R_2$ on one hand, and $R_3$-$R_4$ on the other hand, constitute the ends of a diagonal of the bridge and are connected through a resistance $R_5$ to an integrated amplifier $A_m$ which is also connected to the terminals of the lamp $L_s$. The resistance $R_6$ connected in feed-back relation between the input and the ouput of the amplifier enables to adjust the gain of the device.

The output of the amplifier $A_m$ is connected to the base $b$ of the power transistor T whose collector is connected to the input $E_1$ of the device which is thus at the potential of the lamp $L_s$ and whose emitter constitutes the output terminal $S_1$ and is connected to one end of a coil C of the electro-magnetic brakes of the pulled vehicle, a diode D being connected across the coil C and the other end of the coil C being connected to the output terminal $S_2$ of the device.

The above described device operates as follows:

When the driver of the pulling vehicle pushes on the brake pedal, the stop switch is closed and through a connection (not shown) operating directly the brakes of said vehicle, the pulling vehicle slows down or decelerates and the deceleration is transmitted to the pulled vehicle. At that moment, the stop switch which is closed supplies the current from the battery to the stop lamp $L_s$ and also to the present device. As the deceleration has started, the inertia block M has come closer to the magneto-resistance $R_1$, then the resistance of $R_1$ has increased. Then, the potential in A with respect to the potential in B decreases, thus the voltage increases at the output of the integrated amplifier $A_m$.

Practically in an example of embodiment, the potential difference between A and B is within the range of 0.2 to 0.4 volt for a magneto-resistance having an initial resistance at rest of 200 ohms and with a magnetic inertia block of about 0.5 cm3 of which the North or South pole passes within 1 mm of the magneto-resistance suitably connected for operative purposes.

If $R_5$ is far more important than $R_1$ the amplifier gain $A_m$ is given by - $R_6/R_5$ and can be adjusted by means of the adjustable resistance $R_6$.

The signal at the output of the amplifier is amplified by the transistor T to be applied to the coil C of the brakes.

Since device has to be operational in a large range of temperature and in view of making the output signal independent from the ambient temperature, it is advantageous to replace $R_2$ by another magneto-resistance. Said modification gives a good stability on all the range from 0° to 60° C. It is even possible to make the second magneto-resistance $R_2$ active; in such a case, $R_2$ is placed under the element in rest position as shown in FIG. 1. There is thus obtained a differential working operation (difference between the instantaneous values of $R_1$ and $R_2$). The signal so obtained between A and B is then twice as important. The form of the voltage which is obtained across the coil C is shown as an example in FIG. 4.

Referring now to FIG. 4, the deceleration has been shown in abscissa and the corresponding voltage existing at the terminals of the coil C has been shown in ordinate. Then, for a braking acceleration or deceleration about 1m/s2, the voltage across the coil C is about 2 volts while the voltage is 12 volts for a deceleration of about 6m/s2, the variation of the voltage across the coil C varying substantially linearly between these limits. The pulled vehicle is thus braked more strongly commensurate with the deceleration caused by the braking of the pulling vehicle being important.

Regarding the external or physical aspect of the device of the present invention, its electronic portion is housed in a casing placed in the most suitable area of a pulled vehicle as a trailer or a caravan, while its position has no influence on the operation of the device. The casing can also be placed on the pulling vehicle.

The present invention thus controls the braking of a trailer or any pulled vehicle without requiring the use of the control circuit of the pulling vehicle. Besides, since the system is not really pendular, it is not significally influenced by a slope of 10° to 20° of the vehicle on which is fixed the device, which prevents the requirement for tedious adjustments of the zero found in all the other existing apparatus.

Two fundamental arrangements of the blade L acting as a spring can be found. The blade L can be placed either vertically or horizontally. It should be noted that the vertical position does not require the blade to act as a spring if the bearing point is hingedly mounted (see FIG. 5: rod $r$ movable about a horizontally placed spindles). The return to the rest position is then obtained by the gravity action and a spring effect produced either by the elastic blade L of FIG. 1 or by the springs of FIG. 2 is not required in such a case.

The present invention is not restricted to the embodiment shown and described in detail, for various modifications thereof can moreover be applied thereto without departing from the scope of the present invention as claimed. Especially, the voltage applied to the device can be directly sent to the circuit from a d.c. supply source of suitable value and by means of a hand-control placed on the instrument panel within easy reach of the driver and constituting an emergency control.

I claim:

1. A device for controlling the brakes of a pulled vehicle towed by a pulling vehicle, said device comprising a current source, a control switch connected to said current source, magnetic transducers mounted on one of said vehicles and spaced along a line parallel to the longitudinal axis of said one vehicle and connected to said current source through said control switch, said transducers producing an output signal, said transducers being magneto-resistances interconnected in two arms of a four-arm diagonal bridge having the current source connected to one diagonal, a signal treating means including the other two arms and the other diagonal of said bridge for receiving said output signal, said signal treating means controlling said brakes, setting means to balance said bridge, a magnetic inertia block, spring means for mounting said block on said one vehicle between said transducers for movement substantially parallel to the longitudinal axis of said one vehicle so that said block moves into closer proximity to one of said transducers and farther from the other of said transducers to unbalance the bridge and to modify at least one electric characteristic of said output signal in response to deceleration of said one vehicle to give an output signal substantially proportional to the instantaneous deceleration of a vehicle to control the brakes of a pulled vehicle.

2. A device as claimed in claim 1, in which said two transducers act to compensate for temperature changes.

* * * * *